US 6,618,924 B1

(12) United States Patent
Irwin

(10) Patent No.: US 6,618,924 B1
(45) Date of Patent: Sep. 16, 2003

(54) METHOD FOR CONTROLLING AXLE SHAFT ENDPLAY

(75) Inventor: Earl J. Irwin, Fort Wayne, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/861,654

(22) Filed: May 22, 2001

(51) Int. Cl.[7] .................. B23Q 17/00; B23P 11/00; F16H 48/06
(52) U.S. Cl. ............... 29/407.05; 29/407.01; 29/434; 475/230
(58) Field of Search .............. 29/407.05, 407.01, 29/408, 434, 238, 281.5; 475/230, 331, 231, 242, 246; 411/222, 321

(56) References Cited

U.S. PATENT DOCUMENTS

| 5,058,424 A | * 10/1991 | O'Hara ................ 29/252 |
| 5,131,894 A | 7/1992 | Hilker |
| 5,620,388 A | 4/1997 | Schlegelmann |
| 5,624,345 A | 4/1997 | Graft |
| 5,980,416 A | * 11/1999 | Gafvert ................ 475/230 |
| 6,478,709 B1 | * 11/2002 | Irwin et al. ........... 475/230 |
| 6,497,027 B1 | * 12/2002 | Irwin ................. 29/407.01 |

* cited by examiner

Primary Examiner—John C. Hong
(74) Attorney, Agent, or Firm—Liniak, Berenato & White

(57) ABSTRACT

A method for controlling an axle shaft endplay in a vehicle is disclosed. The desired axle shaft endplay is determined by a manufacturer based on the specific operating conditions of a differential assembly. In accordance with the endplay controlling method of the present invention, first the differential is partially assembled by mounting side gears and a set of differential pinion mate gears in a differential case. Then, the manufacturer determines a thickness of a shim ring disposed between an axle shaft retainer ring and the differential side gear, which would provide the desired endplay. The appropriate shim ring is selected from an endplay controlling kit comprising a plurality of the shim rings of assorted thickness. Next, axle shafts are inserted into the differential case through the side gears, and the selected shim ring is mounted to the axle shaft. Finally, the retainer ring is secured to the axle shaft.

7 Claims, 4 Drawing Sheets

METHOD FOR CONTROLLING AXLE SHAFT ENDPLAY

BACKGROUND OF THE INVENTION

1. Field of the Invention

This invention pertains to differential systems for motor vehicles and, more particularly, the invention pertains to a method for controlling an axle shaft endplay in a differential assembly.

2. Description of the Prior Art

In conventional drivelines, particularly those for rear wheel drive vehicles, the left-hand and right-hand axle shafts extend laterally from a differential assembly that includes side bevel gears in continuous meshing engagement with differential pinion mate gears supported rotatably on a pinion shaft carried on a differential case. The differential case is driven rotatably by a set of meshing bevel gears, one of which is driven by a drive shaft disposed substantially perpendicular to the axle shafts. The side bevel gears typically are connected rotatably to the axle shafts by a spline connection formed on a shoulder near the inboard ends of the axle shafts. Each axle shaft includes also a terminal shoulder at its axially innermost extremity, the terminal shoulder located adjacent the differential pinion shaft.

Located between the shoulders on the axle shaft is an annular groove that is axially aligned with the recess formed on the corresponding side bevel gear. A slotted washer or retainer ring, fitted within the groove of the axle shaft and the recess in the side bevel gear, limits outward axial movement of the axle shaft relative to the side bevel gear. However, each axle shaft is free to move along the spline connection axially inward toward the differential pinion shaft. This amount of an internal axial clearance is called an axle shaft endplay.

The excessive amount of the endplay in the differential assemblies allows the axle shafts to shift axially inwardly relative to the differential case and jar or knock against the pinion shaft. Moreover, the conventional assembly can lead to grinding away of the end of the side yoke causing excessive negative camber, which in turn can lead to uneven tire wear and poor driving stability. It can also cause particles of the side yokes to embed themselves in the differential clutch plates causing slippage of the differential unit resulting in a clunking or thumping noise. If the wear is left unchecked, it may increase to a point where the flange will shear or cut into the differential case causing a leakage of fluid and ultimately leading to complete destruction of the differential assembly.

The current retention method of the axle shaft does not allow an endplay control. Therefore, the need exists to control the endplay of the axle shaft in order to provide a predetermined desired endplay in accordance with vehicle manufacturer's specification and/or depending on the operational conditions of the axle assembly.

SUMMARY OF THE INVENTION

It is an object of the present invention to provide a device and method for controlling an axial displacement (or endplay) of an axle shaft in a differential assembly including an axle shaft having external splines adapted to mate with internal splines of a differential side gear and an annular groove located adjacent to a terminal shoulder provided at an inboard end of the axle shaft. The annular groove is provided for receiving a retainer ring limiting an axial displacement of said axle shaft in an outboard direction.

The device, according to the present invention, for controlling an axle shaft endplay in the differential assembly comprises a shim ring disposed on the inboard end of the axle shaft between the retainer ring and the side gear. The shim ring has a selective thickness such as to provide a desired axle shaft endplay.

The method, according to the present invention, for controlling an axle shaft endplay in a differential assembly is preformed in the following manner: first, a value of a desired endplay $\delta = \delta_P$ is determined based on particular operational conditions and the type of the differential assembly. A differential mechanism is partially assembled including side gears and bevel pinion gears in continuous meshing engagement with the side gears in a differential case. Then, a thickness $W_S$ of the shim ring is calculated that would provide the desired endplay $\delta_P$. In accordance with the present invention, the manufacturer of the axle assemblies is provided with an endplay controlling kit that includes a plurality of the shim rings of assorted thickness. The appropriate shim ring having the determined thickness $W_S$ calculated during the previous step of the present method, is selected from the plurality of the assorted shim rings of the endplay controlling kit. Next, the axle shaft is inserted into the differential case through the side gear, and the selected shim ring is mounted to the axle shaft. The retaining ring is then mounted in the annular groove, and the axle shaft is pulled outboard to sandwich the shim ring between the side gear and the retainer ring. Finally, remaining components of the differential assembly are assembled, thus, completing the process of assembling the differential assembly. The plurality of the shim rings in the endplay controlling kit have the thickness ranging from a thinnest having the thickness $W_{Smin}$ to the thickest having the thickness $W_{Smax}$. The thinner shim rings provide more endplay, and the thicker shim rings provide less endplay. Also, the differential assembly with a zero axle endplay may be provided.

Therefore, the present method for controlling the endplay of the axle shaft solves the need for a solution to the problem of controlling the axle shaft endplay in the vehicular differential assemblies in a simple, efficient and inexpensive manner.

These and other benefits of the present invention will become apparent from the following description and associated drawings.

DESCRIPTION OF THE PREFERRED EMBODIMENT

Figure 1:
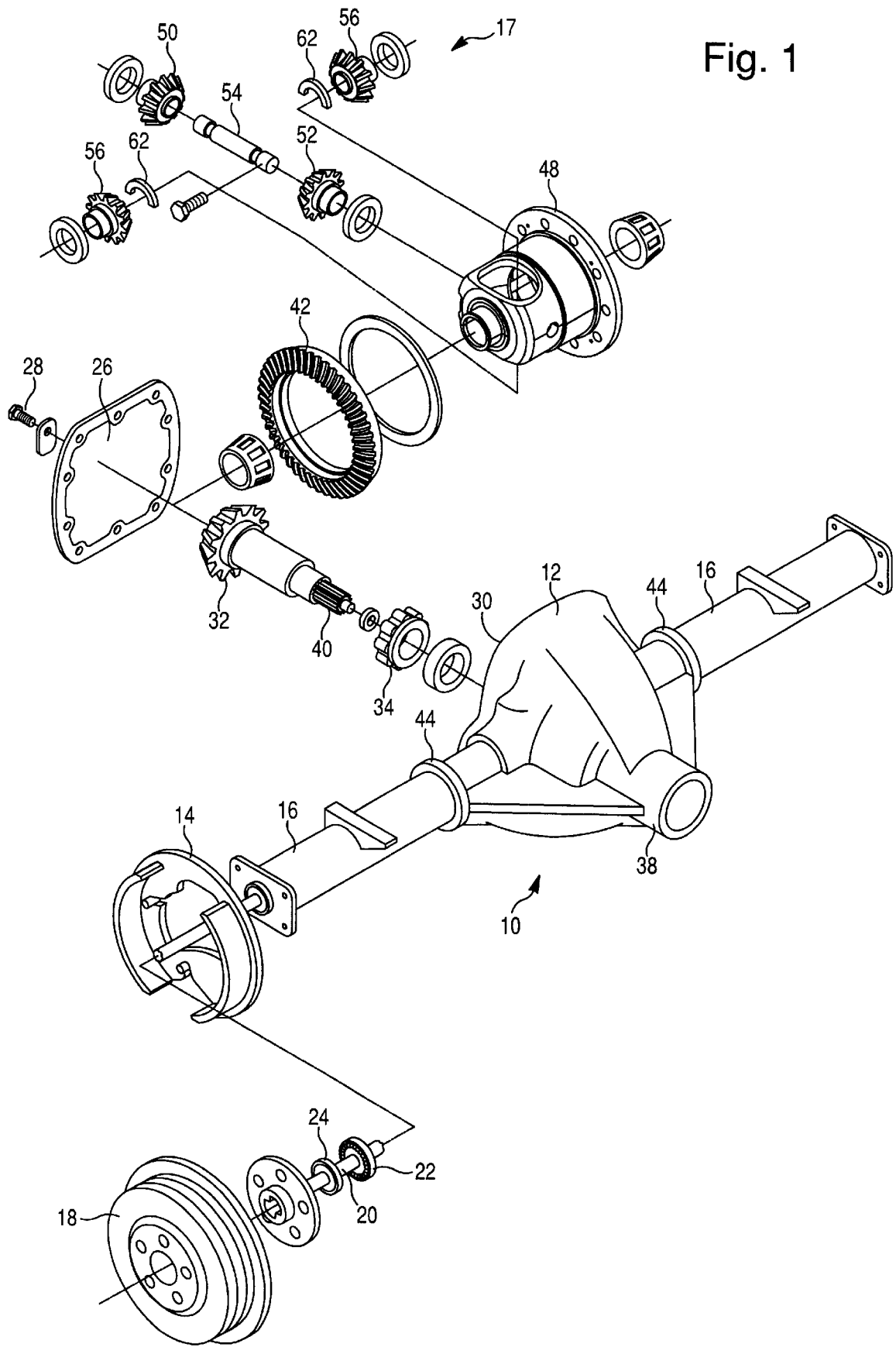
FIG. 1 is an exploded perspective view of an axle assembly including a differential assembly.
Figure 2:
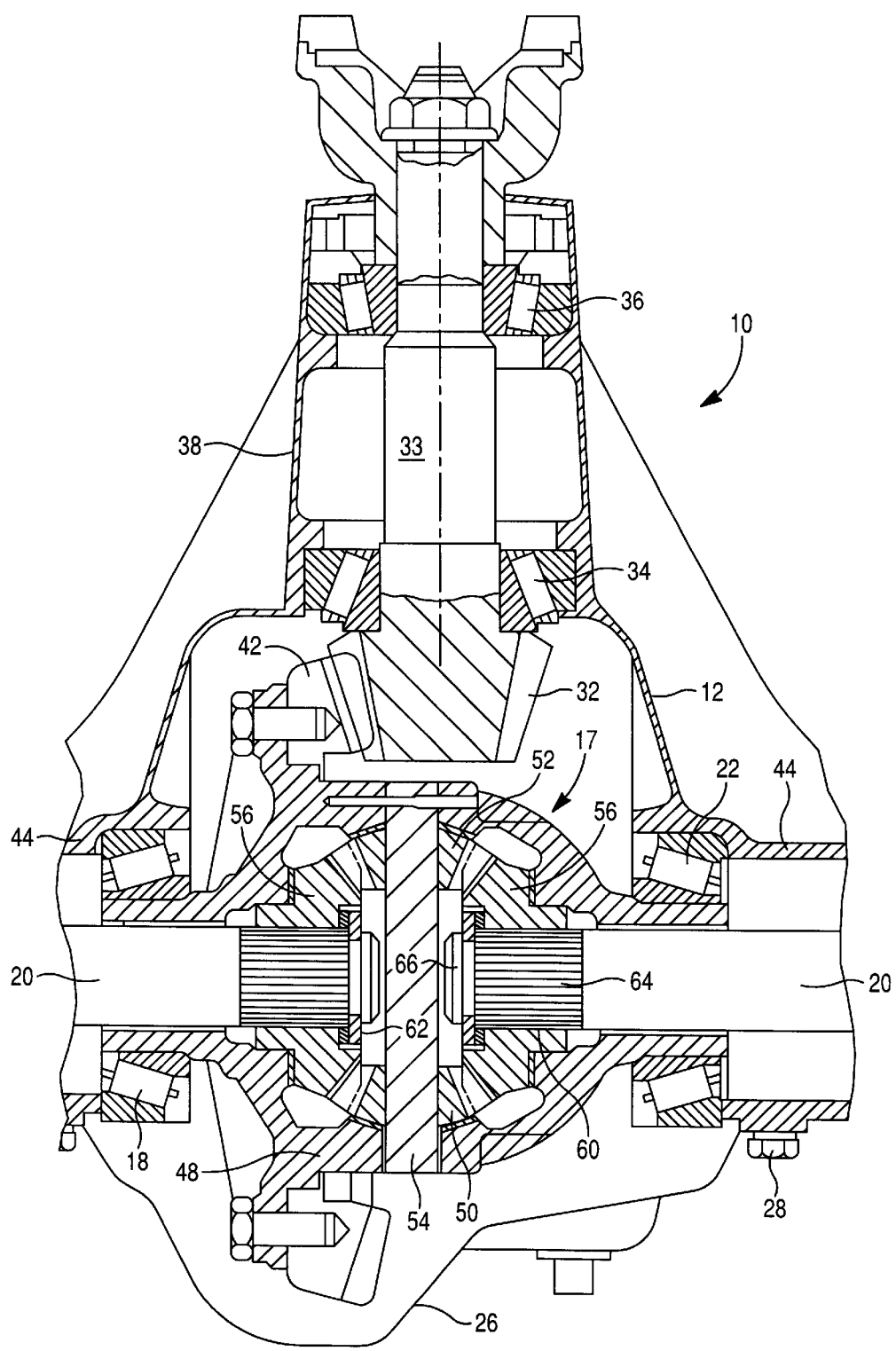
FIG. 2 is a partial cross section through the differential assembly of FIG. 1.

Referring first to FIGS. 1 and 2, an axle assembly 10, to which the present invention can be applied, includes an axle housing 12, which contains a differential assembly 17 and a reservoir of hydraulic lubricant, brake assembly 14 located at the end of an axle tube 16 extending outboard from the ends of the axle housing 12, brake drum 18, axle shafts 20, axle shaft bearings 22, and bearing seals 24.

A cover 26 is connected by bolts 28 to a rear face 30 of the housing 12 hydraulically sealing the housing against the passage of lubricant.

Located within the axle housing 12 is a drive pinion 32 rotatably supported by a rear drive pinion bearing 34 and a front drive pinion bearing 36 supported on an inner surface of a portion of an axle carrier casing 38 that extends forward from a center line of the axle assembly. A drive shaft (not shown), drivably connected to an output shaft of a transmission (not shown), is drivingly connected to a shaft 33 that drives the drive pinion 32.

The axle housing assembly 12 also includes laterally directed tubular extensions 44, which receive therein the axle tubes 16. Located within the axle housing 12 is a differential case 48 housing a differential mechanism. The differential mechanism includes a ring gear 42, in continuous meshing engagement with the drive pinion 32. The differential case 48 supports bevel pinion gears 50, 52 for rotation on a differential pinion shaft or cross pin 54. Side bevel gears 56 are in continuous meshing engagement with the pinions 50, 52 and are drivably connected to left and right axle shafts 20, located within the axle tubes 16.

Figure 4:
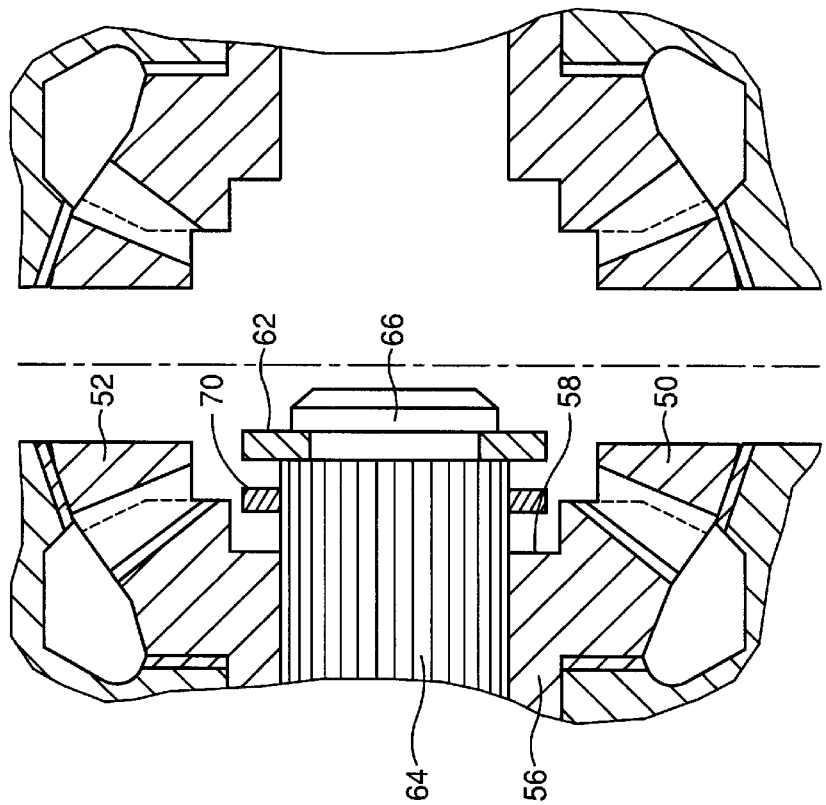
FIG. 4 is a cross section through a centerline of an axle shaft showing the axle shaft in a partially assembled condition.
Figure 3:
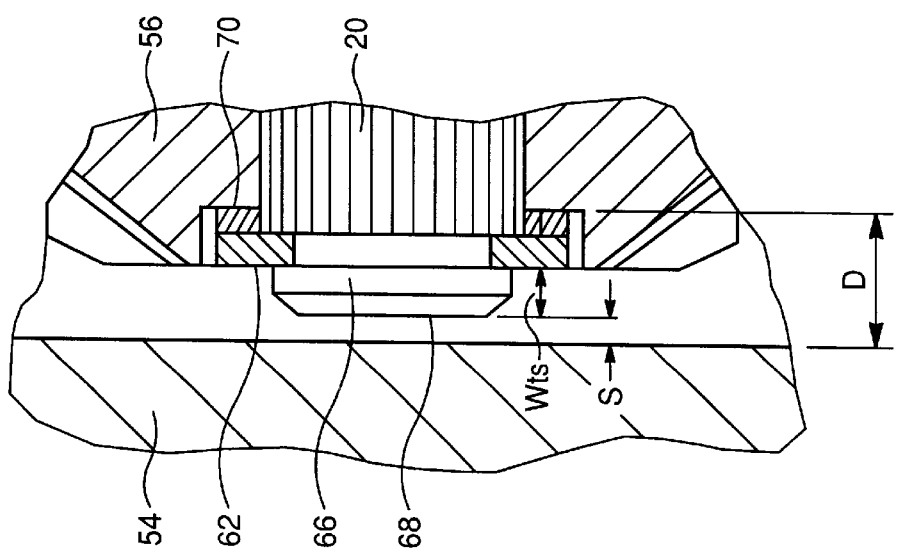
FIG. 3 is a cross section through a centerline of an axle shaft showing the axle shaft in its outermost position.
Figure 5:
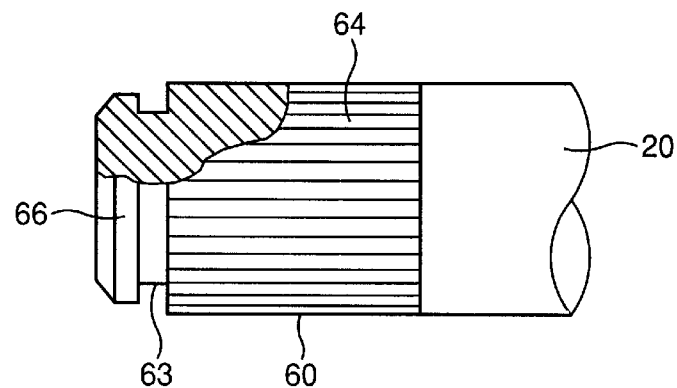
FIG. 5 is a partial sectional view of an onboard end of an axle shaft.

The axle shaft 20 is connected by a spline 60 to the corresponding side bevel gear 56. A slotted retainer ring 62, such as that shown in FIGS. 2–4, is fitted within an annular groove 63 formed on the axle shaft 20 located between a shoulder 64 on which the external spline 60 is formed, as illustrated in detail in FIG. 5. A terminal shoulder 66 located at an inboard end of the axle shaft 20. An annular shim ring 70 is disposed over the shoulder 64 of the axle shaft 20 between the retainer ring 62 and an end surface 58 of the side bevel gear 56. The retainer ring 62 and the shim ring 70 are provided for limiting outward axial movement of the axle shaft 20 relative to the side bevel gear 56 by abutting an end surface 58 thereof. However, each axle shaft 20 is free to move along the spline connection axially inward toward the differential pinion shaft 54. This amount of an internal axial clearance is called an axle shaft endplay.

Figure 6:
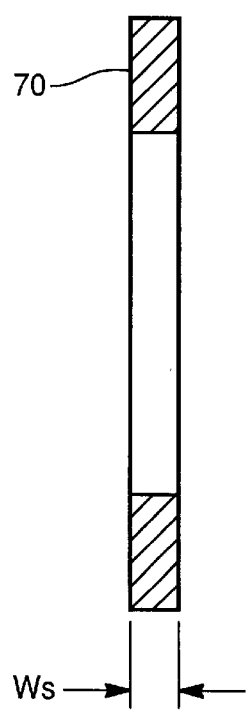
FIG. 6 is a sectional view of a retainer ring.

As illustrated in FIG. 3, the axle shaft endplay is an amount of an internal axial clearance $\delta$ of the axle shaft 20. In other words, the endplay is the amount of possible axial movement of the axle shaft 20 between its innermost position when an inboard contact face 68 of the axle shaft 20 is in contact with an outer cylindrical surface of the pinion shaft 54, and its outermost position when the shim ring 70 is sandwiched between the retainer ring 62 and the end surface 58 of the side gear 56, as shown in FIG. 3. As could be easily understood by those skilled in the art, the amount of the endplay $\delta$ depends, among other factors, on a thickness $W_S$ of the shim ring 70 (see FIG. 6). Obviously, the thicker retainer ring provides less endplay, and vice versa.

In accordance with the present invention, a method for controlling an endplay of the axle shaft 20 is provided. The method is preformed in the following manner: first, a value of a desired endplay $\delta=\delta_P$ is determined based on the particular operational conditions and the type of the differential assembly. The differential mechanism is partially assembled including side gears 56 and the bevel pinion gears 50 and 52 in continuous meshing engagement with the side gears 56 in the differential case 12.

Then, the thickness $W_S$ of the shim ring 70 is calculated in accordance with the following equation:

$$W_S = D - W_{TS} - W_R - \delta_P;  \quad (1)$$

where

D is a distance from the outer cylindrical surface of the pinion shaft 54 to the end surface 58 of the side gear 56, as shown in FIG. 3;

$W_{TS}$ is a thickness of the terminal shoulder 66 of the axle shaft 20, as shown in FIG. 3;

$W_R$ is a thickness of the retainer ring 62; and $\delta_P$ is the predetermined value of the desired endplay.

It will be appreciated that any other appropriate method for determination of the thickness $W_S$ of the shim ring 70 that would provide the desired endplay $\delta_P$, is within the scope of the present invention.

The manufacturer of the axle assemblies is provided with an endplay controlling kit that includes a plurality of the shim rings of assorted thicknesses. Then, the appropriate shim ring 70 (or combination thereof) having the determined thickness $W_S$ calculated utilizing the equation (1), that provides the desired endplay $\delta_P$, is selected from the plurality of the assorted shim rings of the endplay controlling kit. Next, the axle shaft 20 is inserted into the differential case 48 through the side gear 56. The selected shim ring 70 is inserted over the shoulder 64 of the axle shaft 20 from the inboard end thereof. The retaining ring 62 is then mounted in the groove 63, and the axle shaft 20 is pulled outboard to sandwich the shim ring 70 between the side gear 56 and the retainer ring 62. Finally, remaining components of the differential assembly 17 are assembled, thus, completing the assembling process.

It will be appreciated that the plurality of the shim rings in the endplay controlling kit have the thickness ranging from a thinnest having the thickness $W_{Rmin}$ to the thickest having the thickness $W_{Rmax}$. It would be obvious to those skilled in the art that the thinner retainer rings provide more endplay, and the thicker retainer rings provide less endplay. It will be appreciated that the axle assembly with a zero endplay may be provided, when the thickness of the shim ring $W_S$ is calculated in accordance with the following equation:

$$W_S = D - W_{TS} - W_R. \quad (2)$$

Preferably, the thickest retaining rings in the endplay controlling kit has the thickness $W_{Smax} = D - W_{TS} - W_R$, providing the zero endplay.

As evident from the foregoing description, the present invention overcomes the drawbacks inherent in the previous designs of the prior art by providing a method to control or eliminate axle shaft endplay.

Therefore, the method for controlling the endplay of the axle shaft in accordance with the present invention solves the need for a solution to the problem of controlling the axle shaft endplay in the vehicular differential assemblies in a simple, efficient and inexpensive manner.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It will also be understood that words used are words of description rather than a limitation. It is also intended that the scope of the present invention be defined by the claims appended thereto.

What is claimed is:

1. A method for controlling an axle shaft endplay in a differential assembly, said differential assembly comprising an axle shaft non-rotatably engaging a differential side gear and having an annular groove located adjacent to a terminal shoulder provided at an inboard end of said shaft, a retainer ring disposed in said groove for limiting an axial displacement of said axle shaft in an outboard direction and a shim ring positioned on said inboard end of said axle shaft between said retainer ring and said side gear, said method comprising the steps of:

(a) assembling said side gear and a differential pinion mate gears in continuous meshing engagement with said side gear;

(b) determining a desired axle shaft endplay $\delta_P$;

(c) determining a thickness $W_S$ of said shim ring that would provide said desired axle shaft endplay;

(d) selecting said shim ring having the thickness $W_S$ as determined in the preceding step, for selectively controlling said endplay;

(e) inserting said axle shaft through said side gear from said outboard direction toward an inboard direction;

(f) inserting said selected shim ring over said axle shaft from said inboard end thereof;

(g) mounting said retainer ring in said groove in said inboard end of said axle shaft; and (h) pulling said axle shaft outboard to sandwich said shim ring between said side gear and said retainer ring.

2. The method for controlling an axle shaft endplay in a differential assembly as defined in claim 1, wherein said step (c) includes the steps of:

measuring a distance D from a pinion shaft to an end surface of said side gear;

measuring a thickness $W_{TS}$ of said terminal shoulder of said axle shaft;

measuring a thickness $W_R$ of said retainer ring;

determining a thickness $W_S$ of said shim ring that would provide said predetermined shaft endplay, wherein the thickness of said shim ring is determined in accordance with the following equation:

$$W_S = D - W_{TS} - W_R - \delta_P.$$

3. The method for controlling an axle shaft endplay in a differential assembly as defined in claim 1, wherein said retainer ring is a C-ring.

4. The method for controlling an axle shaft endplay in a differential assembly as defined in claim 1, wherein said shim ring is selected from an endplay controlling kit including a plurality of shim rings of assorted thickness.

5. The method for controlling an axle shaft endplay in a differential assembly as defined in claim 4, wherein the thickest shim ring in said endplay controlling kit provides a zero endplay.

6. A method for controlling an axle shaft endplay in a differential assembly, said differential assembly comprising an axle shaft adapted to non-rotatably engage a differential side gear and having an annular groove located adjacent to a terminal shoulder provided at an inboard end of said shaft, a retainer ring disposed in said groove for limiting an axial displacement of said axle shaft in an outboard direction and a shim ring positioned on said inboard end of said axle shaft between said retainer ring and said side gear, said method comprising the steps of:

(a) assembling said side gear and differential pinion mate gears in continuous meshing engagement with said side gear;

(b) determining a desired axle shaft endplay $\delta_P$;

(c) measuring a distance D from a pinion shaft to an end surface of said side gear;

(d) measuring a thickness $W_{TS}$ of said terminal shoulder of said axle shaft;

(e) measuring a thickness $W_R$ of said retainer ring;

(f) determining a thickness $W_S$ of said shim ring that would provide said predetermined shaft endplay, wherein the thickness of said shim ring is determined in accordance with the following equation:

$$W_S = D - W_{TS} - W_R - \delta_P;$$

(g) selecting said shim ring having the thickness $W_S$ as determined in the preceding step, from an axle shaft endplay controlling kit including a plurality of said shim rings of assorted thickness;

(h) inserting said axle shaft through said side gear from said outboard direction toward an inboard direction;

(i) passing said selected shim ring over said axle shaft from said inboard end thereof;

(j) installing said retainer ring in said groove in said inboard end of said axle shaft; and (k) pulling said axle shaft outboard to sandwich said shim ring between said side gear and said retainer ring.

7. The method for controlling an axle shaft endplay in a differential assembly as defined in claim 6, wherein a thickest retainer ring in said endplay controlling kit provides a zero endplay.

* * * * *